US006929882B1

(12) United States Patent
Carter

(10) Patent No.: US 6,929,882 B1
(45) Date of Patent: Aug. 16, 2005

(54) INTEGRATED BATTERY COVER AND MOVABLE HANDLE

(75) Inventor: Dane E. Carter, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/541,849

(22) Filed: Apr. 3, 2000

(51) Int. Cl.⁷ .............................................. H01M 2/10
(52) U.S. Cl. ...................................... 429/187; 429/175
(58) Field of Search ................................ 429/187, 175

(56) References Cited

U.S. PATENT DOCUMENTS

| 4,673,625 A | 6/1987 | McCartney et al. | 429/187 |
|---|---|---|---|
| 4,770,957 A | 9/1988 | Miyagawa | 429/175 |
| D299,639 S | 1/1989 | Anderson et al. | D13/10 |
| 4,857,422 A | 8/1989 | Stocchiero | 429/175 |
| 5,536,595 A | 7/1996 | Inkmann et al. | 429/120 |
| 5,565,283 A | 10/1996 | Chalasani et al. | 429/187 |
| 6,153,329 A | 11/2000 | Raschilla et al. | |
| 6,303,247 B1 | 10/2001 | Griffey et al. | |

Primary Examiner—John S. Maples
(74) Attorney, Agent, or Firm—Jimmy L. Funke

(57) ABSTRACT

Described is a battery cover having a moveable handle which assists in movement of the battery comprising a molded cover securely attached to the battery; the cover having a slotted space in which the handle snugly fits during non-use thereof; the handle being comprised of a U shaped configuration wherein the closed end of the U is configured for engagement to assist in moving manually the battery and wherein the legs of the U are each comprised of a generally arcuate member having a step shaped indentation, the handle pivoting about the circular members when moving from a lowered position to a raised position; and a locking member in contact with the generally arcuate member such that when the handle is in the slotted space of the cover the locking member is in contact with a curved portion of the arcuate member and when the handle is in a raised position the step portion of the arcuate member engages the locking member to maintain the handle in a locked raised position.

6 Claims, 2 Drawing Sheets

INTEGRATED BATTERY COVER AND MOVABLE HANDLE

TECHNICAL FIELD

The present invention pertains to battery handles that permit a battery to be stackable.

BACKGROUND OF THE INVENTION

Present invention pertains to batteries and handles that are used in conjunction with the batteries. Many handle designs attach to a battery case wall. See for example U.S. Pat. No. 5,565,283; see also U.S. Design Patent 299,639 which pertains to a battery cover with a movable handle.

Other handles utilized in conjunction with batteries are described in U.S. Pat. Nos. 5,536,595; 4,857,422; U.S. Pat. No. 4,770,957; U.S. Pat. No. 4,673,625; European Application 297,229 and European Application 324,956.

None of the references offer a battery with a handle that allows the battery to be stackable and facilitates the handle to be in a lowered and locked raised position. In addition, the current invention does not require any features to be placed on the ends of the battery case that might interrupt endwall reinforcements.

SUMMARY OF THE INVENTION

Described is a battery cover having a movable handle which assists in movement of the battery comprising a molded cover securely attached to the battery; the cover having a slotted space in which the handle snugly fits during non-use thereof; the handle being comprised of a U shaped configuration wherein the closed end of the U is configured for engagement to assist in moving manually the battery and wherein the end of legs of the U are each comprised of a generally arcuate member having a step shaped indentation, the handle pivoting about the circular members when moving from a lowered position to a raised position; and a locking member in contact with the generally arcuate member such that when the handle is in the slotted space of the cover the locking member is in contact with a curved portion of the arcuate member and when the handle is in a raised position the step portion of the arcuate member engages the locking member to maintain the handle in a locked raised position.

DESCRIPTION OF THE PREFERRED EMBODIMENT

The present invention pertains to a battery cover with a slot for insertion of the battery handle resulting in a generally flat surface. By virtue of the slot in the cover for the handle, the handle when not in use is in a lowered position. Accordingly therefore, the batteries are stackable. Further the handle being a portion of the cover, therefore eliminates any difficulties associated with having handles or attachments to the side of a battery. Accordingly, the configuration for the present invention facilitates appropriate structural enforcement of the battery itself.

Figure 1:
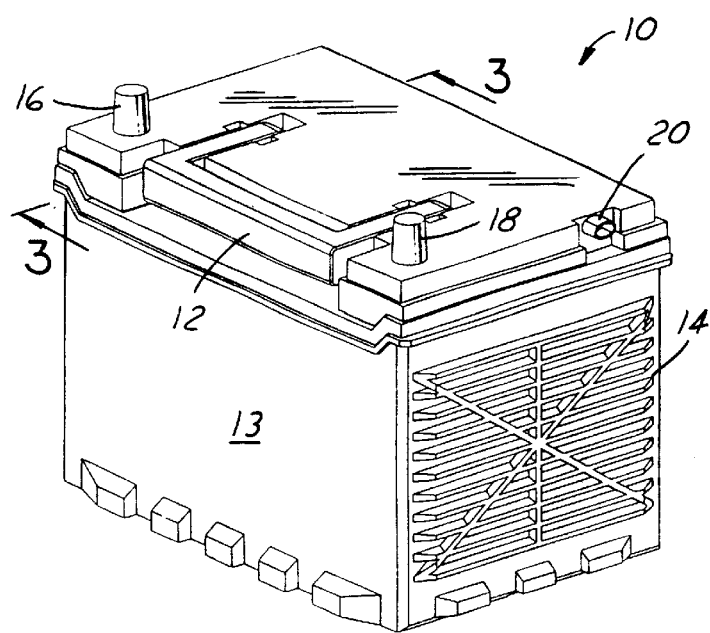
FIG. 1 is a view perspective of the battery with a cover and the handle in the lowered position.
Figure 2:
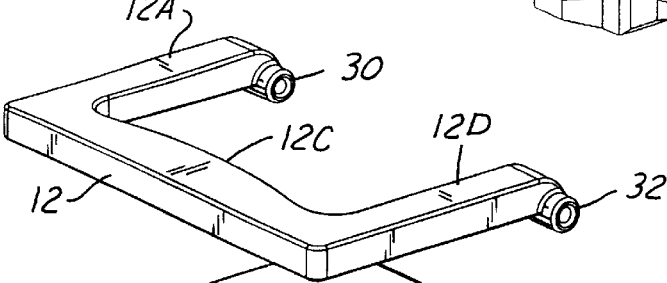
FIG. 2 is an exploded view of the battery cover and handle of the present invention.
Figure 2:
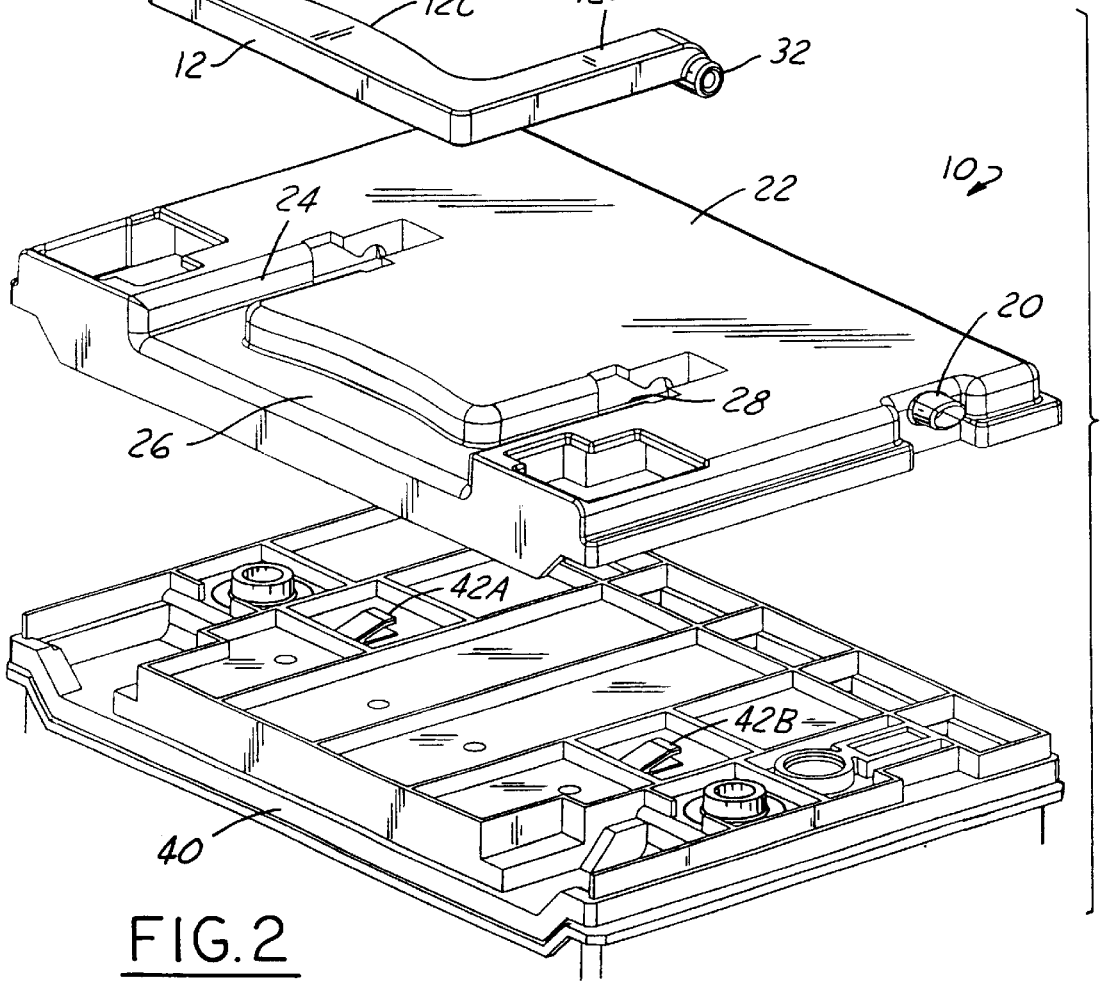

FIG. 1 shows the battery cover and handle 10 with the handle 12 in the lowered position. As depicted, the battery 13 has side supporting structure 14 on the side thereof with terminals 16 and 18. A venting means 20 is likewise depicted as a portion of the cover.

The exploded view of the battery cover 10 shows its component parts, namely the U shaped battery handle 12, the cover 22 and the slot made up of corresponding U shaped configuration 24, 26 and 28. The U shaped handle has legs 12a and 12b with the portion that can be engaged 12c to assist in moving the battery manually. Arcuate end portions 30 and 32 are shown at the end of the legs of the U shaped handle. When the handle is in the lowered position, the components of the handle 12a, 12b and 12c respectively fit into cover slot portions 24, 28 and 26 respectively. The cover 22 fits snugly in place onto the battery top segment 40 and is aligned therewith. Locking members for the handle 42a and 42b come in direct contact with arcuate members 30 and 32 respectively.

Figure 3:
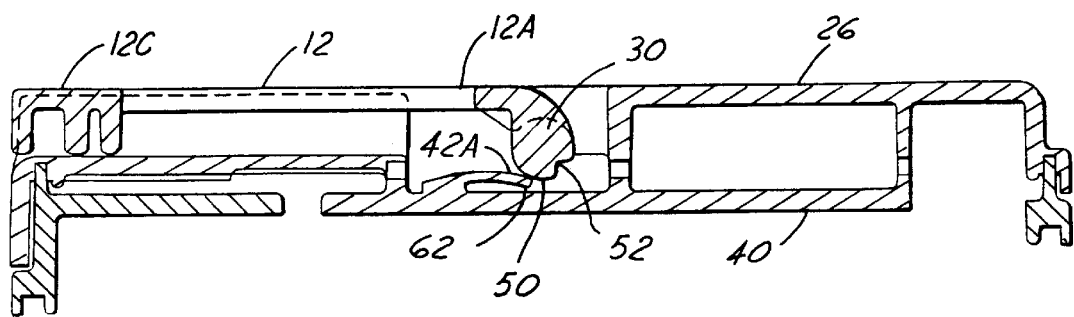
FIG. 3 is taken along lines 3—3 of FIG. 1.

As shown in FIG. 3 when the handle is in the lowered position, the arcuate member 30 has a curved portion 50 with a step indentation thereto 52. The locking member 42a as shown in FIG. 3 is in the shape of a leaf spring. It is generally formed by a molding process which is embedded in the battery cover 40. It is to be appreciated that the locking members 42a and 42b can take on numerous configurations and need not be a moldable plastic but could be a metallic element as well. All that is required for the invention is that there be the locking member 42 which has the ability to align with step indentation 52 of the arcuate member 32 when the handle is in the raised position as shown in FIG. 4.

Figure 4:
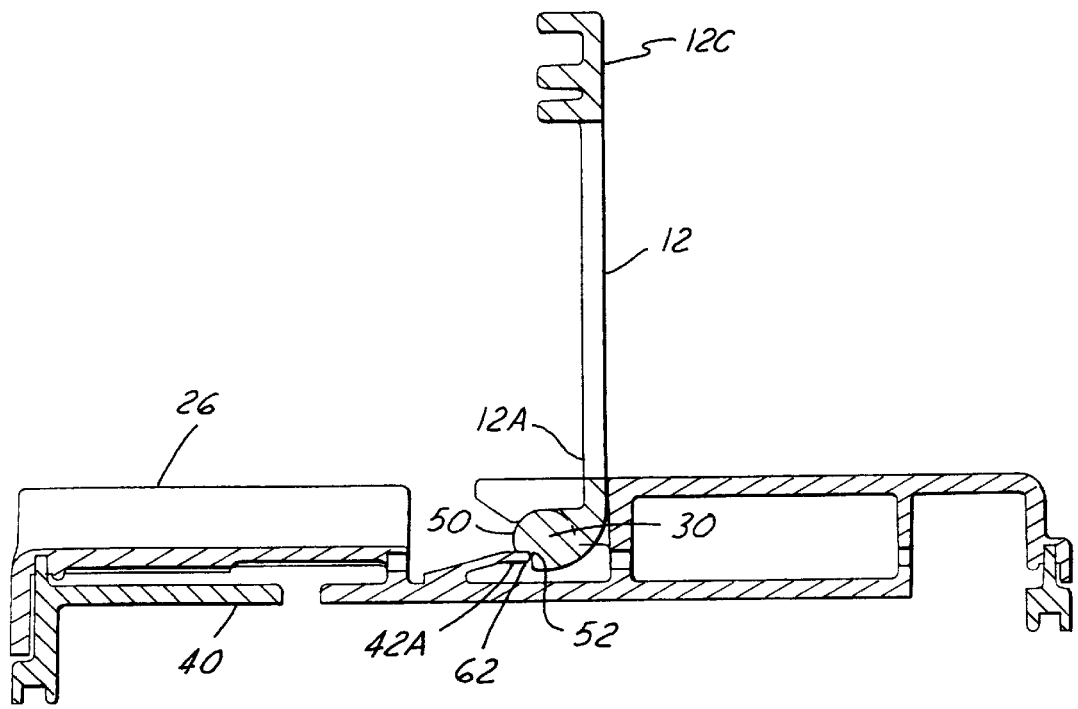
FIG. 4 is a FIG. 3 with the battery handle in the raised locked position.

The arcuate member 30 and 32 are shown generally in FIGS. 3 and 4 as having a curved surface 50 which can readily rotate about the tip 62 of the locking members 42a or 42b (other side not shown). The arcuate member can likewise take different configurations other than a circular one as shown in FIGS. 3 and 4. The arcuate member may be elliptical in shape or completely circular in shape or ball shaped and the like.

In general the invention can be described DEC as handle with cylindrical pivots that engage mating hinge or cantilever features in a top cover of a battery. The cylindrical pivots are inserted between the battery covers through an appropriately sized opening in the top cover. The pivots are then pressed between cantilever members leading into the hinges on the bottom of the top cover and a raised rib on the lower cover. With the handle in the lowered position, it is DEC recessed into the cover so that it does not extend above the top of the upper cover. When the handle is in the upright position the pivot and hinge features are kept engaged by an indent on the pivot or arcuate member that interferes with the raised rib or arcuate member or cantilever member on the lower cover. It is to be appreciated that the handle and cover for the battery may be manufactured of a variety of materials. One type of material is a molded plastic such as polyethylene, polypropylene, and the like with or without supporting glass fibers inserted therein.

While the forms of the invention herein disclose constitutes presently preferred embodiments, many others are possible. It is not intended here into mention all of the possible equivalent forms or ramifications of the invention. It is understood that the terms used herein are merely descriptive, rather than limiting and that various changes may be made without departing from the spirit or scope of the invention.

What is claimed is:

1. A battery cover having a moveable handle which assists in movement of the battery comprising:
   - a molded cover securely attached to the battery, the cover having a slotted space in which the handle fits during non-use thereof;
   - the handle being comprised of a U shaped configuration wherein the closed end of the U is configured for engagement to assist in moving manually the battery and wherein the legs of the U are each comprised of a generally arcuate member having a step shaped indentation, the handle pivoting about an axis through the arcuate members when moving from a lowered position to a raised position; and
   - a locking member in contact with the generally arcuate member such that when the handle is in the slotted space of the cover the locking member is in contact with a curved portion of the arcuate member and when the handle is in a raised position the step portion of the arcuate member engages the locking member to maintain the handle in a locked raised position.

2. The cover of claim 1 wherein the locking member is a leaf spring secured to a bottom of the cover.

3. The cover of claim 1 wherein the locking member is a portion of a molded plastic member and is comprised of a cantilevered portion which engages the step indentation of the arcuate member.

4. The cover of claim 1 wherein the arcuate member is generally circular in shape.

5. The cover of claim 1 wherein the arcuate member is elliptical in shape.

6. The cover of claim 1 wherein its overall configuration permits the battery to be stackable, one battery on top of another.

* * * * *